UNITED STATES PATENT OFFICE.

THOMAS JOHN IRELAND CRAIG, OF MANCHESTER, ENGLAND, ASSIGNOR TO PETER SPENCE & SONS LIMITED, OF MANCHESTER, ENGLAND.

MANUFACTURE OF SODIUM BICHROMATE.

994,129.

Specification of Letters Patent. Patented June 6, 1911.

No Drawing. Application filed October 8, 1910. Serial No. 585,991.

*To all whom it may concern:*

Be it known that I, THOMAS JOHN IRELAND CRAIG, D. Sc., a subject of the King of Great Britain and Ireland, and a resident of Manchester, in the county of Lancaster, England, have invented a new and useful Manufacture of Sodium Bichromate, of which the following is a specification.

In the manufacture of sodium bichromate as described in the specification to U. S. A. Patent No. 725,501, dated the 14th day of April, 1903, a part of the process consists in driving off by boiling in a suitable closed vessel, the ammonia from a solution containing ammonium chromate and sodium chromate, such solution being at the same time concentrated by the boiling.

It has since been ascertained in practice that the elimination of ammonia from the solution is assisted by passing into the liquor before its concentration or boiling in the closed vessel described, a current of steam. This method of treating the liquor however, although efficient, necessitates considerable consumption of fuel to raise the necessary steam.

In carrying my present invention into effect for the removal of ammonia from a solution containing ammonium chromate and sodium chromate, I concentrate the solution to a high degree by boiling, for example to a sp. g. of about 1.85 at its boiling point, i. e. approximately 120 degrees centigrade, and then pass into it in a suitable vessel, for example a still, steam at a temperature well above the boiling point of the liquor at about this degree of concentration. Such steam I will, for the purposes of this invention, call high temperature steam, and it may be obtained by generation under the necessary pressure to give the required temperature or by superheating. The remaining ammonia contained in the concentrated solution is readily removed as far as is desirable by this treatment.

The passage of the high temperature steam into the concentrated solution may be the only passage of steam into the liquor in carrying out my present invention, but it is preferred, in addition, to treat unconcentrated solution which is on its way to the concentrating and boiling vessel by passing into it steam which is given off by and from solution which is being boiled and concentrated. With this preliminary treatment of the solution with steam which is given off by the solution being boiled and concentrated and with the treatment of the concentrated liquor with high temperature steam, a very large economy in the amount of fuel necessary for steam raising is effected. Practical tests have shown, for example, that by this improved process the amount of such fuel required is less than one-tenth of that required by the prior process in use.

The temperature of the steam employed may vary within wide limits provided it is applied at a temperature well above the boiling point of the concentrated liquor under treatment. I may for example employ dry steam at a pressure of about 100 lbs. per square inch or I may, as a further example, superheat steam at a pressure of about seventy-five pounds per square inch to a temperature of about 300° C.

I may employ pressure to raise the boiling point of the concentrated liquor and thus assist the action of the higher temperature steam which is passing into it.

What I claim is:—

1. In the production of sodium bichromate, removing ammonia from a concentrated solution containing sodium chromate and ammonium chromate by passing high temperature steam into such concentrated solution, substantially as set forth.

2. In the production of sodium bichromate, removing ammonia from a concentrated solution containing sodium chromate and ammonium chromate and which solution is under pressure, by passing high temperature steam into such concentrated solution while under pressure, substantially as set forth.

3. In the production of sodium bichromate by the removal of ammonia from a solution containing sodium chromate and ammonium chromate, treating the unconcentrated solution with steam derived from solution which is being boiled and concentrated and treating the concentrated solution with high temperature steam substantially as set forth.

4. In the production of sodium bichromate by the removal of ammonia from a solution containing sodium chromate and ammonium chromate, treating the unconcentrated solution with steam derived from solution which is being boiled and concentrated and treating the concentrated solution under pressure with high temperature steam, substantially as set forth.

In witness whereof I have hereunto set my hand in the presence of two subscribing witnesses.

THOMAS JOHN IRELAND CRAIG.

Witnesses:
　WILLIAM GEO. HEYS,
　JOHN O'CONNELL.